United States Patent
Ohashi

(10) Patent No.: US 10,998,841 B2
(45) Date of Patent: May 4, 2021

(54) POWER CONVERSION DEVICE, MOTOR DRIVE UNIT, AND ELECTRIC POWER STEERING DEVICE

(71) Applicant: Nidec Corporation, Kyoto (JP)

(72) Inventor: Hiromitsu Ohashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/486,528

(22) PCT Filed: Jan. 10, 2018

(86) PCT No.: PCT/JP2018/000376
§ 371 (c)(1),
(2) Date: Aug. 16, 2019

(87) PCT Pub. No.: WO2018/173425
PCT Pub. Date: Sep. 27, 2018

(65) Prior Publication Data
US 2019/0372500 A1     Dec. 5, 2019

(30) Foreign Application Priority Data

Mar. 24, 2017 (JP) .............................. JP2017-058735

(51) Int. Cl.
H02P 27/06 (2006.01)
H02P 6/182 (2016.01)
H02M 7/48 (2007.01)
H02P 25/18 (2006.01)

(52) U.S. Cl.
CPC .............. *H02P 27/06* (2013.01); *H02M 7/48* (2013.01); *H02P 25/18* (2013.01)

(58) Field of Classification Search
CPC ............... H02P 23/26; H02P 6/34; H02P 3/12
See application file for complete search history.

(56) References Cited

U.S. PATENT DOCUMENTS 7,154,237 B2  12/2006  Welchko et al.
8,743,573 B2   6/2014  Balpe
(Continued)

FOREIGN PATENT DOCUMENTS

CN    103684196 A    3/2014
CN    104167975 A   11/2014
(Continued)

OTHER PUBLICATIONS

Official Communication issued in International Patent Application No. PCT/JP2018/000376, dated Apr. 17, 2018.

*Primary Examiner* — Kawing Chan
*Assistant Examiner* — Charles S Laughlin
(74) *Attorney, Agent, or Firm* — Keating & Bennett

(57) ABSTRACT

A power conversion device includes a first inverter connected to first ends of m (m is an integer equal to two or more) coil groups, a second inverter connected to second ends of the m coil groups, m−1 separation relay circuits connected between two adjacent coil groups of the m coil groups, m−1 first neutral point relay circuits provided between two adjacent coil groups of the first inverter side of each of the m−1 separation relay circuits, and m−1 second neutral point relay circuits provided between two adjacent coils of the second inverter side of each of the m−1 separation relay circuits.

4 Claims, 10 Drawing Sheets

(56) References Cited

U.S. PATENT DOCUMENTS

| | | | | |
|---|---|---|---|---|
| 2004/0164636 A1* | 8/2004 | Okamoto | ................ | H02K 3/28 |
| | | | | 310/179 |
| 2016/0090960 A1* | 3/2016 | Ramamoorthy | ...... | F02N 11/087 |
| | | | | 290/31 |
| 2018/0351482 A1* | 12/2018 | Kanazawa | ................ | H02P 6/10 |

FOREIGN PATENT DOCUMENTS

| JP | 2013-121222 A | 6/2013 |
|---|---|---|
| JP | 2014-192950 A | 10/2014 |
| JP | 2014-204574 A | 10/2014 |
| JP | 2015-033268 A | 2/2015 |

* cited by examiner

POWER CONVERSION DEVICE, MOTOR DRIVE UNIT, AND ELECTRIC POWER STEERING DEVICE

CROSS REFERENCE TO RELATED APPLICATIONS

This is a U.S. national stage of PCT Application No. PCT/JP2018/000376, filed on Jan. 10, 2018, and priority under 35 U.S.C. § 119(a) and 35 U.S.C. § 365(b) is claimed from Japanese Application No. 2017-058735, filed Mar. 24, 2017; the entire disclosures of each application are hereby incorporated herein by reference.

FIELD OF THE INVENTION

The present disclosure relates to a power conversion device, a motor drive unit, and an electric power steering device.

BACKGROUND

Recently, electromechanical integrated motors in which an electric motor (hereinafter, simply referred to as a "motor"), a power conversion device, and an electronic control unit (ECU) are integrated have been developed. In particular, in the field of vehicles, high quality assurance is required from the viewpoint of safety. Therefore, a redundant design that can continue to operate safely even when some parts fail has been introduced. As an example of a redundant design, a method of providing two power conversion devices for one motor is being studied. As another example, a method of providing a backup microcontroller with a main microcontroller is being studied.

In a related art, a power conversion device that includes a control unit and two inverters and converts power to supply it to a three-phase motor is disclosed. The two inverters are connected to a power supply and a ground (hereinafter referred to as "GND"). One inverter is connected to one end of a three-phase winding of the motor, and the other inverter is connected to the other end of the three-phase winding. Each of the inverters has a bridge circuit composed of three legs each having a high-side switching element and a low-side switching element. The control unit switches motor control from normal state control to abnormal state control when the control unit detects a malfunction of the switching element in the two inverters. Under the normal state control, for example, the motor is driven by switching the switching elements of the two inverters. Under the abnormal state control, for example, the motor is driven by the inverter that has not malfunctioned using a neutral point of the winding provided in the inverter that has malfunctioned.

SUMMARY

In the prior art described above, further improvement in an output of the motor is required.

One aspect of an example embodiment of the present disclosure provides a power conversion device which converts power supplied from a power supply into power to be supplied to an n-phase (n is an integer equal to three or more) motor including m (m is an integer equal to three or more) coil groups connected in series, which includes a first inverter connected to first ends of the m coil groups, a second inverter connected to second ends of the m coil groups, m−1 separation relay circuits connected between two adjacent coil groups of the m coil groups, wherein each of the m−1 separation relay circuits switches between connection and disconnection of the two adjacent coil groups, m−1 first neutral point relay circuits provided between two adjacent coil groups of the first inverter side of each of the m−1 separation relay circuits, each of the m−1 first neutral point relay circuits switches between connection and disconnection of ends of the coil group of the first inverter side among the two adjacent coil groups, and m−1 second neutral point relay circuits provided between two adjacent coils of the second inverter side of each of the m−1 separation relay circuits, each of the m−1 second neutral point relay circuits switches between connection and disconnection of ends of the coil group of the second inverter side among the two adjacent coil groups.

The above and other elements, features, steps, characteristics and advantages of the present disclosure will become more apparent from the following detailed description of the example embodiments with reference to the attached drawings.

DETAILED DESCRIPTION

Hereinafter, example embodiments of power conversion devices, motor drive units, and electric power steering devices of the present disclosure will be described in detail with reference to the accompanying drawings. However, in order to facilitate the understanding of those skilled in the art, unnecessary parts may be omitted the following description to avoid redundant description. For example, detailed descriptions of content that is already well known and redundant descriptions of substantially the same configuration may be omitted.

In this specification, example embodiments of the present disclosure will be described as examples of a power conversion device that converts power supplied from a power supply into power to be supplied to a three-phase motor having three-phase (U-phase, V-phase, and W-phase) windings (which may be referred to as "coils"). However, a power conversion device that converts power supplied from a power supply into power to be supplied to an n-phase motor having an n-phase (n is an integer of four or more) winding, such as a four-phase winding or a five-phase winding, is also within the scope of the present disclosure.

[Structures of Motor Drive Unit 1000 and Power Conversion Device 100]

Figure 1:
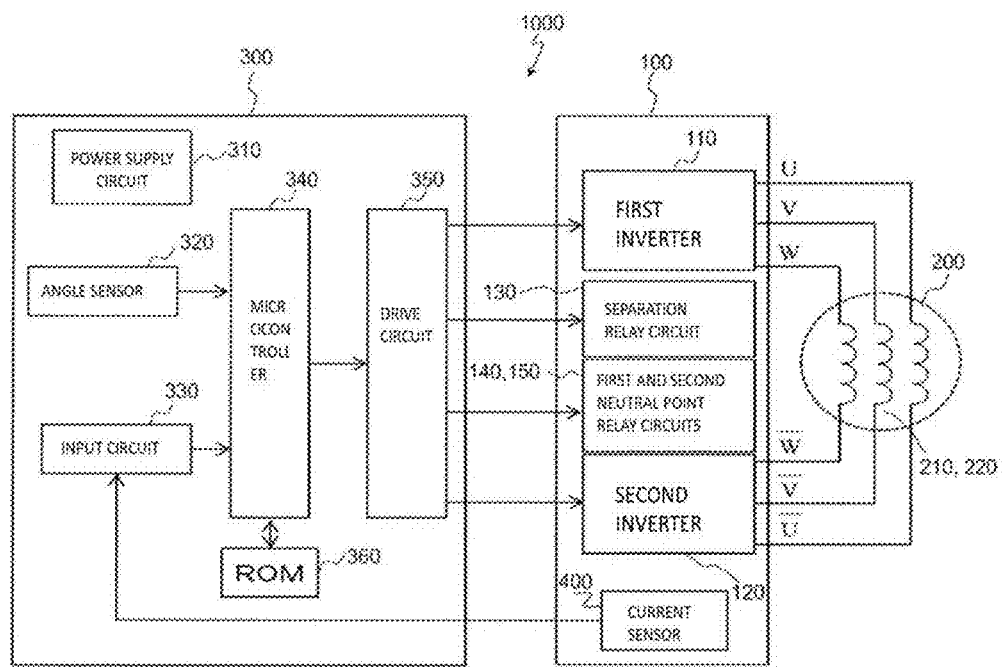
FIG. 1 is a block diagram showing a typical block configuration of a motor drive unit (1000) according to a first example embodiment of the present disclosure.

FIG. 1 is a schematic view showing a typical block configuration of a motor drive unit 1000 according to the present example embodiment.

The motor drive unit 1000 typically includes a power conversion device 100, a motor 200, and a control circuit 300.

The motor drive unit 1000 may be modularized, and may be manufactured and sold as, for example, a motor module having a motor, a sensor, a driver, and a controller. In this specification, the motor drive unit 1000 will be described as an example of a system including the motor 200 as a component. However, the motor drive unit 1000 may be a system for driving the motor 200, which does not include the motor 200 as a component.

The power conversion device 100 includes a first inverter 110, a second inverter 120, a separation relay circuit 130, a first neutral point relay circuit 140, a second neutral point relay circuit 150, and a current sensor 400. The power conversion device 100 may convert power supplied from a power supply 101 (see FIG. 2) into power to be supplied to the motor 200. For example, the first and second inverters 110 and 120 may convert direct current (DC) power into three-phase alternating current (AC) power, which is a pseudo-sine wave of a U-phase, a V-phase, and a W-phase.

The first inverter 110 is connected to a first coil group 210 of the motor 200, and the second inverter 120 is connected to a second coil group 220. In this specification, the term "connection" between parts (components) mainly refers to electrical connection.

The motor 200 is, for example, a three-phase AC motor. The motor 200 includes the first and second coil groups 210 and 220. Each of the first and second coil groups 210 and 220 has U-phase, V-phase, and W-phase windings. The first and second coil groups 210 and 220 may be connected in series by the separation relay circuit 130 to be described below. A winding method of the windings may include a concentrated winding method or a distribution winding method.

The control circuit 300 includes a microcontroller or the like. The control circuit 300 controls the power conversion device 100 in response to input signals from the current sensor 400 and the angle sensor 320. As the control method, there are, for example, a vector control method, a pulse width modulation (PWM) method, and a direct torque control (DTC) method.

A detailed circuit configuration of the power conversion device 100 will be described with reference to FIG. 2.

Figure 2:
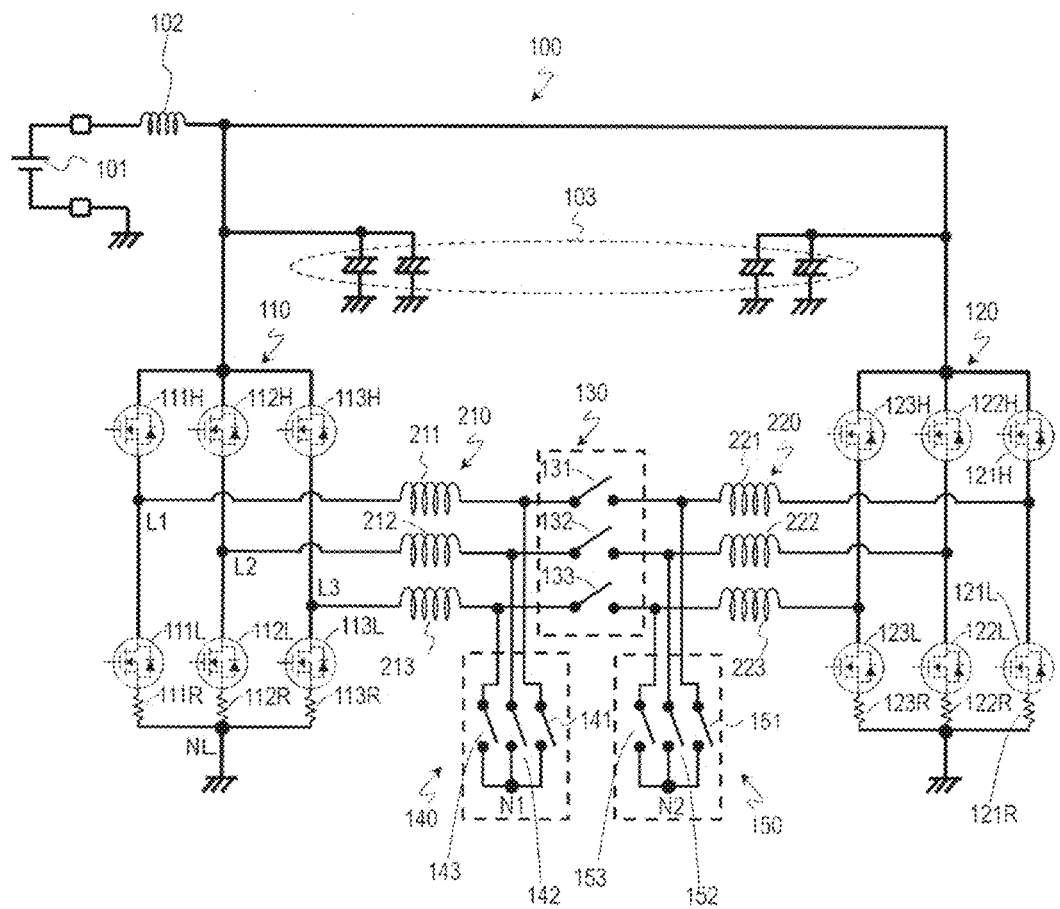
FIG. 2 is a circuit diagram showing a typical circuit configuration of a power conversion device (100) according to the first example embodiment of the present disclosure.

FIG. 2 is a schematic view showing a typical circuit configuration of the power conversion device 100 according to the present example embodiment.

The power conversion device 100 typically includes a power supply 101, a coil 102, a condenser 103, a first inverter 110, a second inverter 120, a separation relay circuit 130, a first neutral point relay circuit 140, and a second neutral point relay circuit 150.

The power supply 101 generates a predetermined power voltage (e.g., a voltage of 12 V). For example, a DC power supply is used as the power supply 101. However, the power supply 101 may be an AC-to-DC converter or a DC-to-DC converter, or may be a battery (storage battery). The power supply 101 may be a common single power supply of the first and second inverters 110 and 120, or may include a first power supply for the first inverter 110 and a second power supply for the second inverter 120.

The coil 102 is provided between the power supply 101 and each inverter. The coil 102 functions as a noise filter and smooths high frequency noise included in a voltage waveform supplied to each inverter or high frequency noise generated in each inverter so as not to flow out to the power supply 101. Further, the condenser 103 is connected to a power supply terminal of each inverter. The condenser 103 is a so-called bypass condenser and suppresses voltage ripples. The condenser 103 is, for example, an electrolytic condenser, and the capacity thereof and the number of condensers 103 to be used are appropriately determined according to design specifications and the like.

The first inverter 110 includes a bridge circuit having three legs. Each of the legs has a high-side switching element and a low-side switching element. Specifically, a leg for a U-phase has a high-side switching element 111H and a low-side switching element 111L. A leg for a V-phase has a high-side switching element 112H and a low-side switching element 112L. A leg for a W-phase has a high-side switching element 113H and a low-side switching element 113L. As the switching elements, for example, a field effect transistor (typically referred to as a metal-oxide-semiconductor field-effect transistor (MOSFET)) or an insulated-gate bipolar transistor (IGBT) may be used.

The first inverter 110 has, for example, shunt resistors 111R, 112R, and 113R in the legs as the current sensor 400 (see FIG. 1) for detecting currents flowing in the U-phase, V-phase, and W-phase windings, respectively. The current sensor 400 has a current detection circuit (not shown) for detecting the current flowing in each of the shunt resistors. For example, the shunt resistor may be disposed between and connected to the low-side switching element and the GND in each of the legs. A resistance value of the shunt resistor is, for example, in a range of about 0.5 mΩ to 1.0 mΩ.

The number of shunt resistors is not limited to three. For example, it is possible to use two shunt resistors 111R and 112R for a U-phase and a V-phase, two shunt resistors 112R and 113R for a V-phase and a W-phase, or two shunt resistors 111R and 113R for a U-phase and a W-phase. The number of shunt resistors to be used and the arrangement of the shunt resistors are appropriately determined in consideration of product cost, design specifications, and the like.

The second inverter 120 includes a bridge circuit having three legs. A leg for a U-phase has a high-side switching element 121H and a low-side switching element 121L. A leg for a V-phase has a high-side switching element 122H and a low-side switching element 122L. A leg for a W-phase has a high-side switching element 123H and a low-side switching element 123L. Similar to the first inverter 110, the second inverter 120 includes, for example, shunt resistors 121R, 122R, and 123R.

The first inverter 110 is connected to one end of the first coil group 210. Specifically, the leg (i.e., a node between the high-side switching element and the low-side switching element) for the U-phase of the first inverter 110 is connected to one end of a U-phase coil 211 of the first coil group 210. The leg for the V-phase is connected to one end of a V-phase coil 212. The W-phase leg is connected to one end of a W-phase coil 213.

The second inverter 120 is connected to one end of the second coil group 220. Specifically, the leg for the U-phase of the second inverter 120 is connected to one end of a U-phase coil 221 of the second coil group 220. The leg for the V-phase is connected to one end of a V-phase coil 222. The leg for the W-phase is connected to one end of a W-phase coil 223.

The separation relay circuit 130 is connected to the other end of the first coil group 210 and the other end of the second coil group 220. The separation relay circuit 130 may switch between connection and disconnection of the first and second coil groups 210 and 220.

The separation relay circuit 130 includes three separation relays 131, 132, and 133 for switching between connection and disconnection of the three coils 211, 212, and 213 of the first coil group 210 and the three coils 221, 222, and 223 of the second coil group 220. Specifically, the separation relay 131 is connected to the other end of the coil 211 of the first coil group 210 and the other end of the coil 221 of the second coil group 220 and switches between connection and disconnection of the coils. The separation relay 132 is connected to the other end of the coil 212 and the other end of the coil 222 and switches between connection and disconnection of the coils. The separation relay 133 is connected to the other end of the coil 213 and the other end of the coil 223 and switches between connection and disconnection of the coils.

The first neutral point relay circuit 140 is connected to the other end of the first coil group 210. The first neutral point relay circuit 140 may switch between connection and disconnection of the other ends of the first coil group 210.

The first neutral point relay circuit 140 includes three first neutral point relays 141, 142, and 143 of which one ends are commonly connected to a node N1 and of which the other ends are connected to the three coils 211, 212, and 213 of the first coil group 210. Specifically, the first neutral point relay 141 is connected to the node N1 and the other end of the coil 211. The first neutral point relay 142 is connected to the node N1 and the other end of the coil 212. The first neutral point relay 143 is connected to the node N1 and the other end of the coil 213.

The second neutral point relay circuit 150 is connected to the other end of the second coil group 220. The second neutral point relay circuit 150 may switch between connection and disconnection of the other ends of the second coil group 220.

The second neutral point relay circuit 150 includes three second neutral point relays 151, 152, and 153 of which one ends are commonly connected to a node N2 and of which the other ends are connected to the three coils 221, 222, and 223 of the second coil group 220. Specifically, the second neutral point relay 151 is connected to the node N2 and the other end of the coil 221. The second neutral point relay 152 is connected to the node N2 and the other end of the coil 222. The second neutral point relay 153 is connected to the node N2 and the other end of the coil 223.

As the above-described separation relay and neutral point relays, for example, semiconductor switching elements, such as MOSFETs, thyristors, analog switch integrated circuits (ICs), Triacs, or the like, or mechanical relays may be used.

Hereinafter, on-and-off states of the separation relay circuit 130 and the first and second neutral point relay circuits 140 and 150, and an electrical connection relationship between the first and second coil groups 210 and 220 in the on-and-off state will be described in detail.

When the separation relay circuit 130 is turned on, the first coil group 210 and the second coil group 220 are connected. When the separation relay circuit 130 is turned off, the first coil group 210 is electrically separated from the second coil group 220. The sentence "the separation relay circuit 130 is turned on" means that the separation relays 131, 132, and 133 in the separation relay circuit 130 are all turned on, and the sentence "the separation relay circuit 130 is turned off" means that the separation relays 131, 132, and 133 are all turned off.

When the first neutral point relay circuit 140 is turned on, the other ends of the three-phase coils 211, 212, and 213 of the first coil group 210 are connected. As a result, the first coil group 210 is Y-connected. The node N1 in the first neutral point relay circuit 140 may function as a neutral point. When the first neutral point relay circuit 140 is turned off, the other ends of the three-phase coils 211, 212, and 213 are not connected. The sentence "the first neutral point relay circuit 140 is turned on" means that the first neutral point relays 141, 142, and 143 in the first neutral point relay circuit 140 are all turned on, and the sentence "the first neutral point relay circuit 140 is turned off" means that the first neutral point relays 141, 142, and 143 are all turned off.

When the second neutral point relay circuit 150 is turned on, the other ends of the three-phase coils 221, 222, and 223 of the second coil group 220 are connected. As a result, the second coil group 220 is Y-connected. The node N2 in the second neutral point relay circuit 150 may function as a neutral point. When the second neutral point relay circuit 150 is turned off, the other ends of the three-phase coils 221, 222, and 223 are not connected. The sentence "the second neutral point relay circuit 150 is turned on" means that the second neutral point relays 151, 152, and 153 in the second neutral point relay circuit 150 are all turned on, and the sentence "the second neutral point relay circuit 150 is turned off" means that the second neutral point relays 151, 152, and 153 are all turned off.

In the present example embodiment, the separation relay circuit 130 and the first and second neutral point relay circuits 140 and 150 are not turned on or off at the same time. When the separation relay circuit 130 is turned on, the first and second neutral point relay circuits 140 and 150 are turned off. When the separation relay circuit 130 is turned off, at least one of the first and second neutral point relay circuits 140 and 150 is turned on.

Referring again to FIG. 1, the control circuit 300 includes, for example, a power supply circuit 310, an angle sensor 320, an input circuit 330, a microcontroller 340, a drive circuit 350, and a read only memory (ROM) 360. The control circuit 300 is connected to the power conversion device 100. The control circuit 300 controls the power conversion device 100, specifically, the first inverter 110, the second inverter 120, the separation relay circuit 130, the first neutral point relay circuit 140, and the second neutral point relay circuit 150.

The control circuit 300 may realize closed loop control by controlling a target position (rotation angle), a target rotation speed, and a target current of a rotor. For example, the rotation speed is obtained by time-differentiating the rotation angle (rad), and is represented by the number of rotations (rpm) at which the rotor rotates for a unit time (e.g., one minute). The control circuit 300 may include a torque sensor instead of the angle sensor. In this case, the control circuit 300 may control a target motor torque.

The power supply circuit 310 generates a DC voltage (e.g., a voltage of 3 V or 5 V) which is necessary for each block in the circuit.

The angle sensor 320 is, for example, a resolver or a Hall IC. The angle sensor 320 is realized by a combination of a magnetoresistive (MR) sensor having an MR element and a sensor magnet. The angle sensor 320 detects a rotation angle (hereinafter referred to as "a rotation signal") of the rotor of the motor 200, and outputs the rotation signal to the microcontroller 340. According to the motor control method (e.g., sensorless control), the angle sensor 320 may not be required.

The input circuit 330 receives a current value (hereinafter referred to as "an actual current value") of the motor, which is detected by the current sensor 400. The input circuit 330 changes a level of the actual current value to an input level of the microcontroller 340 and outputs the actual current value to the microcontroller 340. The input circuit 330 is an analog-to-digital conversion circuit.

The microcontroller 340 receives the rotation signal of the rotor, which is detected by the angle sensor 320. The microcontroller 340 sets a target current value according to the actual current value and the rotation signal of the rotor to generate a PWM signal, and outputs the PWM signal to the drive circuit 350.

For example, the microcontroller 340 generates a PWM signal for controlling a switching operation (turn-on operation or turn-off operation) of each switching element in the first and second inverters 110 and 120 of the power conversion device 100. The microcontroller 340 may generate signals for determining an on-and-off state of each separation relay in the separation relay circuit 130 of the power conversion device 100 and determining an on-and-off state of each neutral point relay in the first and second neutral point relay circuits 140 and 150.

The drive circuit 350 is typically a gate driver. The drive circuit 350 generates a control signal (e.g., a gate control signal) for controlling a switching operation of each switching element in response to the PWM signal, and provides the control signal to the switching element. In addition, the drive circuit 350 may generate control signals for turning the relays on and off in response to the signals for determining the on-and-off state of each separation relay and each neutral point relay which are received from the microcontroller 340, and provide the control signals to the separation relay and the neutral point relay. The microcontroller 340 may have a function of the drive circuit 350. In this case, the drive circuit 350 is not required.

The ROM 360 is, for example, a writable memory (e.g., a programmable ROM (PROM)), a rewritable memory (e.g., a flash memory), or a ROM. The ROM 360 stores a control program including a group of instructions for causing the microcontroller 340 to control the power conversion device 100. For example, the control program is temporarily deployed in a random access memory (RAM) (not shown) at boot time.

Hereinafter, a specific example of an operation of the motor drive unit 1000 will be described, and a specific example of an operation of the power conversion device 100 will be mainly described.

Control of the power conversion device 100 includes normal state control and abnormal state control. The control circuit 300 (mainly, the microcontroller 340) may switch the control of the power conversion device 100 from normal state control to abnormal state control.

The term "normal state" refers to a state in which no malfunction occurs in the switching elements of the first and second inverters 110 and 120. The power conversion device 100 has first and second operation modes under the normal state control. The first operation mode is an operation mode in which a high motor output (high output) due to high-speed rotation of the motor is not required. The first operation mode corresponds to a conventional mode which is generally used for driving a power conversion device in which one inverter is connected to one end of a coil and the other inverter is connected to the other end of the coil. The second operation mode is an operation mode in which a high output due to high-speed rotation of the motor is required. The control circuit 300 may switch the normal operation mode between the first and second operation modes.

The control circuit 300 turns the separation relay circuit 130 on and turns the first and second neutral point relay circuits 140 and 150 off. Accordingly, in a state in which the first inverter 110 is connected to one end of the first coil group 210 and the second inverter 120 is connected to one end of the second coil group 220, the other ends of the first and second coil groups 210 and 220 are connected. In the above connection state, the first and second inverters 110 and 120 perform three-phase conduction control for independently controlling currents flowing in the three-phase coils.

Figure 3:
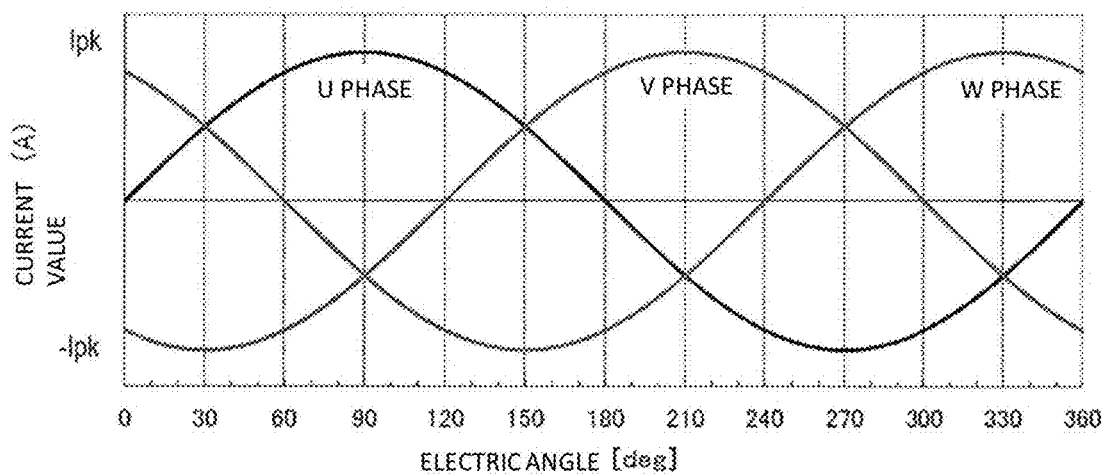
FIG. 3 is a graph showing examples of current waveforms (sine waves) obtained by plotting values of currents flowing in a U-phase coil, a V-phase coil, and a W-phase coil of a motor (200) when three-phase conduction control is performed.

FIG. 3 shows examples of current waveforms (sine waves) obtained by plotting values of currents flowing in a U-phase coil, a V-phase coil, and a W-phase coil of the motor 200 when three-phase conduction control is performed. In the current waveforms of FIG. 3, the current values are plotted every electric angle of 30°. $I_{pk}$ denotes a maximum current value (peak current value) of each phase.

Table 1 shows values of currents flowing in the coils of respective phases for each electric angle in the sine waves of FIG. 3. Specifically, Table 1 shows the values of the currents flowing from the first inverter 110 to the coils of respective phases at every electric angle of 30°, and the values of the currents flowing from the second inverter 120 to the coils of respective phases at every electric angle of 30°. Here, for the first inverter 110, a direction of the current flowing from the first inverter 110 to the coils of respective phases is defined as a positive direction. The direction of the current shown in FIG. follows the above definition. In addition, for the second inverter 120, a direction of the current flowing from the second inverter 120 to the coils of respective phases is defined as a positive direction. Therefore, a phase difference between the current of the first inverter 110 and the current of the second inverter 120 is 180°. In Table 1, a magnitude of a current value $I_1$ is $[(3)^{1/2}/2]*I_{pk}$, and a magnitude of a current value $I_2$ is $I_{pk}/2$.

TABLE 1

| Normal Operation | | Electric Angle [deg.] | | | | | | | | | | | |
|---|---|---|---|---|---|---|---|---|---|---|---|---|---|
| | | 0 (360) | 30 | 60 | 90 | 120 | 150 | 180 | 210 | 240 | 270 | 300 | 330 |
| First Inverter | U-Phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V-Phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W-Phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| Second Inverter | U-Phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V-Phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W-Phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

At an electric angle of 0°, no current flows in the two U-phase coils 211 and 221. A current having a magnitude $I_1$ flows in the two V-phase coils 212 and 222 from the second inverter 120 to the first inverter 110, and a current having the magnitude $I_1$ flows in the two W-phase coils 213 and 223 from the first inverter 110 to the second inverter 120.

At an electric angle of 30°, a current having a magnitude $I_2$ flows in the two U-phase coils 211 and 221 from the first inverter 110 to the second inverter 120, a current having a magnitude $I_{pk}$ flows in the two V-phase coils 212 and 222 from the second inverter 120 to the first inverter 110, and a current having the magnitude $I_2$ flows in the two W-phase coils 213 and 223 from the first inverter 110 to the second inverter 120.

At an electric angle of 60°, a current having the magnitude $I_1$ flows in the two U-phase coils 211 and 221 from the first inverter 110 to the second inverter 120, and a current having the magnitude $I_1$ flows in the two V-phase coils 212 and 222 from the second inverter 120 to the first inverter 110. No current flows in the two W-phase coils 213 and 223.

At an electric angle of 90°, a current having the magnitude $I_{pk}$ flows in the two U-phase coils 211 and 221 from the first inverter 110 to the second inverter 120, a current having the magnitude $I_2$ flows in the two V-phase coils 212 and 222 from the second inverter 120 to the first inverter 110, and a current having the magnitude $I_2$ flows in the two W-phase coils 213 and 223 from the second inverter 120 to the first inverter 110.

At an electric angle of 120°, a current having the magnitude $I_1$ flows in the two U-phase coils 211 and 221 from the first inverter 110 to the second inverter 120, and a current having the magnitude $I_1$ flows in the two W-phase coils 213 and 223 from the second inverter 120 to the first inverter 110. No current flows in the two V-phase coils 212 and 222.

At an electric angle of 150°, a current having the magnitude $I_2$ flows in the two U-phase coils 211 and 221 from the first inverter 110 to the second inverter 120, a current having the magnitude $I_2$ flows in the two V-phase coils 212 and 222 from the first inverter 110 to the second inverter 120, and a current having the magnitude $I_{pk}$ flows in the two W-phase coils 213 and 223 from the second inverter 120 to the first inverter 110.

At an electric angle of 180°, no current flows in the two U-phase coils 211 and 221. A current having the magnitude $I_1$ flows in the two V-phase coils 212 and 222 from the first inverter 110 to the second inverter 120, and a current having the magnitude $I_1$ flows in the two W-phase coils 213 and 223 from the second inverter 120 to the first inverter 110.

At an electric angle of 210°, a current having the magnitude $I_2$ flows in the two U-phase coils 211 and 221 from the second inverter 120 to the first inverter 110, a current having the magnitude $I_{pk}$ flows in the two V-phase coils 212 and 222 from the first inverter 110 to the second inverter 120, and a current having the magnitude $I_2$ flows in the two W-phase coils 213 and 223 from the second inverter 120 to the first inverter 110.

At an electric angle of 240°, a current having the magnitude $I_1$ flows in the two U-phase coils 211 and 221 from the second inverter 120 to the first inverter 110, and a current having the magnitude $I_1$ flows in the two V-phase coils 212 and 222 from the first inverter 110 to the second inverter 120. No current flows in the two W-phase coils 213 and 223.

At an electric angle of 270°, a current having the magnitude $I_{pk}$ flows in the two U-phase coils 211 and 221 from the second inverter 120 to the first inverter 110, a current having the magnitude $I_2$ flows in the two V-phase coils 212 and 222 from the first inverter 110 to the second inverter 120, and the current having the magnitude $I_2$ flows in the two W-phase coils 213 and 223 from the first inverter 110 to the second inverter 120.

At an electric angle of 300°, a current having the magnitude $I_1$ flows in the two U-phase coils 211 and 221 from the second inverter 120 to the first inverter 110, and a current having the magnitude $I_1$ flows in the two W-phase coils 213 and 223 from the first inverter 110 to the second inverter 120. No current flows in the two V-phase coils 212 and 222.

At an electric angle of 330°, a current having the magnitude $I_2$ flows in the two U-phase coils 211 and 221 from the second inverter 120 to the first inverter 110, a current having the magnitude $I_2$ flows in the two V-phase coils 212 and 222 from the second inverter 120 to the first inverter 110, and a current having the magnitude $I_{pk}$ flows in the two W-phase coils 213 and 223 from the first inverter 110 to the second inverter 120.

In the current waveforms shown in FIG. 3, a total sum of the values of the currents flowing in the three-phase coils in consideration of the direction of the current becomes zero for each electric angle. However, according to the circuit configuration of the power conversion device 100, the currents flowing in the three-phase coils may be independently controlled, and thus it is possible to perform control such that the total sum of the values of the currents does not become zero. For example, the control circuit 300 controls the switching operation of each switching element of the first and second inverters 110 and 120 by PWM control in which the current waveforms shown in FIG. 3 are obtained.

The control circuit 300 may switch the operation mode from the first operation mode to the second operation mode when a high output due to high-speed rotation of the motor is required. In the second operation mode, the separation relay circuit 130 is turned off and the first and second neutral point relay circuits 140 and 150 are turned on. Accordingly, the first coil group 210 is separated from the second coil group. The other ends of the first coil group 210 are Y-connected, and the other ends of the second coil group 220 are Y-connected. By the above connection, each of the node N1 of the first neutral point relay circuit 140 and the node N2 of the second neutral point relay circuit 150 functions as a neutral point.

The first inverter 110 is connected to the Y-connected first coil group 210, and the second inverter 120 is connected to the Y-connected second coil group 220. In the above connection state, the first inverter 110 may allow the first coil group 210 to be conductive, and the second inverter 120 may allow the second coil group 220 to be conductive.

Figure 4:
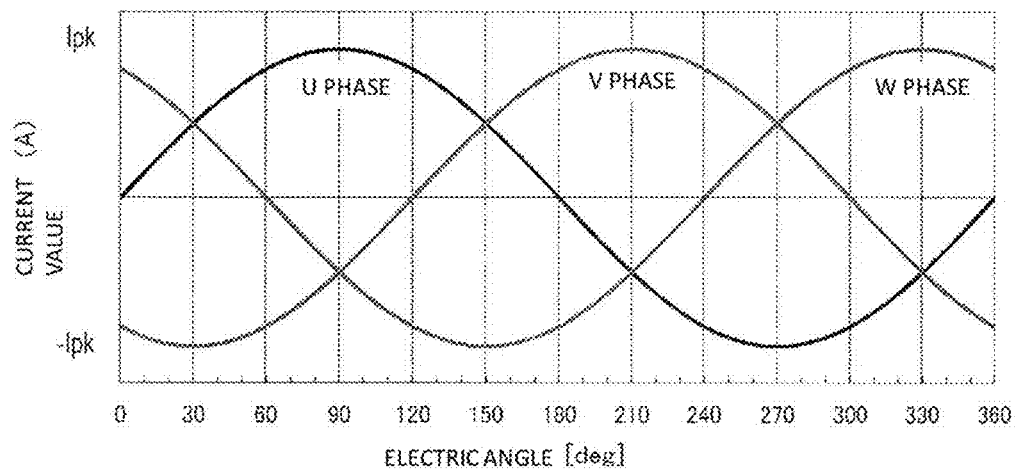
FIG. 4 is a graph showing examples of current waveforms (sine waves) obtained by plotting values of currents flowing in a second coil group (220) of the motor (200) when a second inverter (120) performs three-phase conduction control.

FIG. 4 shows examples of current waveforms (sine waves) obtained by plotting values of currents flowing in the second coil group 220 of the motor 200 when the second inverter 120 performs three-phase conduction control. A horizontal axis indicates an electric angle (deg.) of the motor, and a vertical axis indicates a current value (A). In the current waveforms of FIG. 4, the current values are plotted every electric angle of 30°. $I_{pk}$ denotes a maximum current value (peak current value) of each phase.

Table 2 shows values of currents flowing in the coils of respective phases of the second coil group 220 for each electric angle in the sine waves of FIG. 4. Positive and negative signs of the current values shown in FIG. 4 follow the definition of the current direction described above.

the motor cannot be driven in the first and second operation modes. For example, when a MOSFET is used as the switch element, malfunctions may be largely classified into an open malfunction and a short malfunction. The term "open malfunction" refers to a malfunction in which a source-drain of a FET is open (in other words, resistance (rds) between source-drains becomes high impedance), and the term "short malfunction" refers to a malfunction in which the source-drain of the FET is short-circuited. Hereinafter, the operation mode will be described on the assumption that a malfunction occurs in the switching element of the first inverter 110. Similarly, control by the operation mode is also applied to the case in which a malfunction occurs in the switching element of the second inverter 120.

For example, the control circuit 300 turns on the separation relay circuit 130 and turns off the first and second neutral point relay circuits 140 and 150 in the same manner as in the first operation mode. Accordingly, the first coil group 210 is connected to the second coil group 220.

It is assumed that an open malfunction occurs in the high-side switching element 111H of the first inverter 110 (see FIG. 2). For example, the control circuit 300 turns off the other high-side switching elements 112H and 113H of

TABLE 2

| | | Electric Angle [deg.] | | | | | | | | | | |
|---|---|---|---|---|---|---|---|---|---|---|---|---|
| Normal Operation | | 0 (360) | 30 | 60 | 90 | 120 | 150 | 180 | 210 | 240 | 270 | 300 | 330 |
| Second Inverter | U-Phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V-Phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W-Phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

For example, at an electric angle of 30°, a current having magnitude $I_2$ flows in the U-phase coil 221 toward the second inverter 120, a current having magnitude $I_{pk}$ flows in the V-phase coil 222 from the second inverter 120, and a current having magnitude $I_2$ flows in the W-phase coil 223 toward the second inverter 120. At an electric angle of 60°, a current having magnitude $I_1$ flows in the U-phase coil 221 toward the second inverter 120, and a current having magnitude $I_1$ flows in the V-phase coil 222 from the second inverter 120. No current flows in the W-phase coil 223.

In a general Y-connection type motor, a sum of values of currents flowing in three-phase windings in consideration of a direction of the current is zero for each electrical angle. For example, the control circuit 300 may control the switching operation of each switching element of the second inverter 120 by PWM control in which the current waveforms shown in FIG. 4 are obtained. The control circuit 300 may control the first inverter 110 in the same manner as the second inverter 120. Since an overall conductive current is not changed between the first and second operation modes, an assistance torque of the motor is the same.

In a connection method of Y-connection, a method of improving a voltage utilization ratio using potentials (neutral point potentials) of nodes N1 and N2 is known. Specifically, a maximum voltage applied to the coils may be increased by superimposing a third harmonic component of a three-phase voltage. By positively using the above method, it is possible to rotate the motor 200 at a higher speed in the second operation mode than in the first operation mode.

A third operation mode is an operation mode used for abnormal state control. The term "abnormal state" mainly refers to a state in which a malfunction occurs in the switch elements of the first and second inverters 110 and 120 and the first inverter 110, and turns on all the low-side switching elements 111L, 112L, and 113L. By the above control, a node NL (see FIG. 2) at a low side of the first inverter 110 may function as a neutral point. The second inverter 120 that has not malfunctioned may allow the first and second coil groups 210 and 220 to be conductive using the neutral point of the first inverter 110.

The sentence "a node functions as a neutral point" means that potentials of three nodes L1, L2, and L3 (nodes between high-side switching elements and low-side switching elements of respective legs) which connect legs of each phase of an inverter to coils of each phase are made equal. On-and-off patterns of the switching elements for making the three nodes equal in potential are not limited to the patterns described above, and may be various other patterns.

For example, the control circuit 300 may control the switching operation of each switching element of the second inverter 120 by PWM control in which the current waveforms shown in FIG. 4 are obtained. The second inverter 120 allows the first and second coil groups 210 and 220 to be conductive.

The power conversion device 100 includes an H bridge for each phase. A U-phase H bridge has a leg including the switching elements 111H and 111L, and a leg including the switching elements 121H and 121L. A V-phase H bridge has a leg including the switching elements 112H and 112L, and a leg including the switching elements 122H and 122L. A W-phase H bridge has a leg including the switching elements 113H and 113L, and a leg including the switching elements 123H and 123L. For example, the power conversion device 100 may perform two-phase conduction control using two other H bridges other than an H bridge including a switching element that has malfunctioned.

For example, when an open malfunction occurs in the high-side switching element 111H of the first inverter 110, the U-phase H bridge may not be used. The power conversion device 100 performs two-phase conduction control using V- and W-phase H bridges. Even when the V- or W-phase H bridge cannot be used, the power conversion device 100 may perform two-phase conduction control using different two-phase H bridges.

Figure 5:
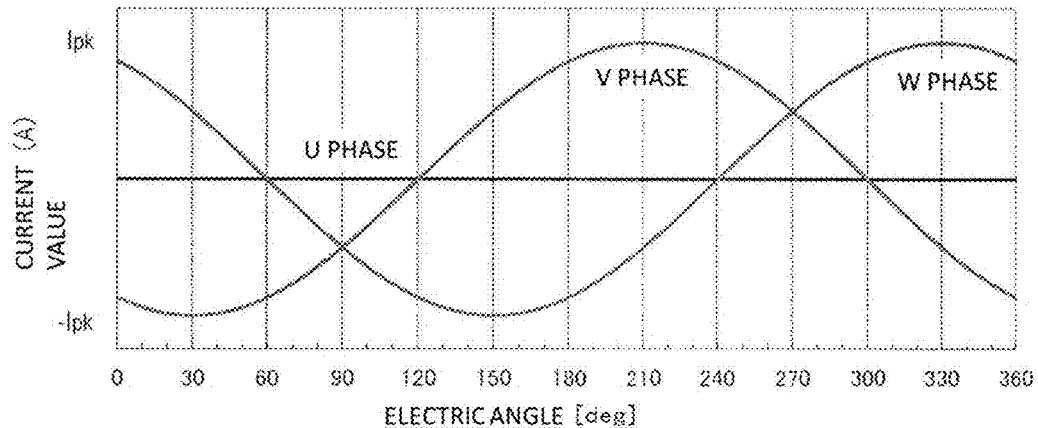
FIG. 5 is a graph showing examples of current waveforms (sine waves) obtained by plotting values of currents flowing in first and second coil groups (210, 220) of the motor (200) when two-phase conduction control is performed.

FIG. 5 shows examples of current waveforms (sine waves) obtained by plotting values of currents flowing in the first and second coil groups 210 and 220 of the motor 200 when the power conversion device 100 performs two-phase conduction control. A horizontal axis indicates an electric angle (deg.) of the motor, and a vertical axis indicates a current value (A). In the current waveforms of FIG. 5, the current values are plotted every electric angle of 30°. $I_{pk}$ denotes a maximum current value (peak current value) of each phase. The power conversion device 100 may allow V- and W-phase coils to be conductive using V- and W-phase H bridges that have not malfunctioned. Accordingly, the motor drive may be continued.

As another example, the motor drive may be performed by allowing the coil group which is connected to the inverter to be conductive using an inverter that has not malfunctioned and not using an inverter that has malfunctioned. For example, when an open malfunction occurs in the high-side switching element 111H of the first inverter 110, the control circuit 300 may turn the separation relay circuit 130 and the first neutral point relay circuit 140 off and turn the second neutral point relay circuit 150 on. The motor drive may be performed by allowing the Y-connected second coil group 220 to be conductive using the second inverter 120.

Figure 6:
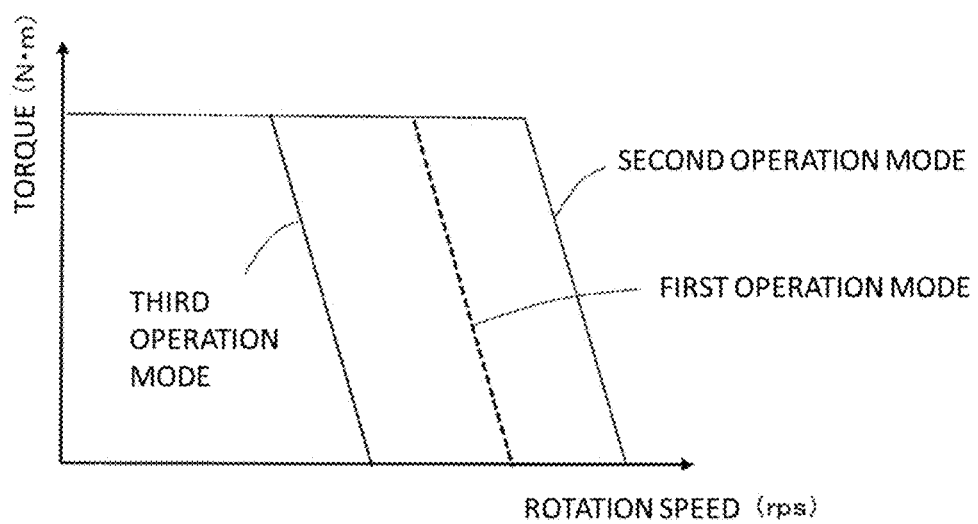
FIG. 6 is a graph showing a relationship between the number of rotations (N, rps) of a motor per unit time and a torque (T, N·m).

FIG. 6 shows a relationship between the number of rotations N (rps) of a motor per unit time and a torque T (N-m). FIG. 6 shows so-called T-N curves for each of the first to third operation modes described above.

According to the present example embodiment, in the power conversion device 100 in which the first inverter 110 is connected to one end of the first coil group 210 and the second inverter 120 is connected to one end of the second coil group 220, it is possible to switch the connection method of the two coil groups by turning the separation relay circuit 130 and the first and second neutral point relay circuits 140 and 150 on or off according to a predetermined pattern. Accordingly, the operation mode may be switched between the first operation mode and the second operation mode, and the high-speed drive of the motor 200 may be further improved.

Figure 7:
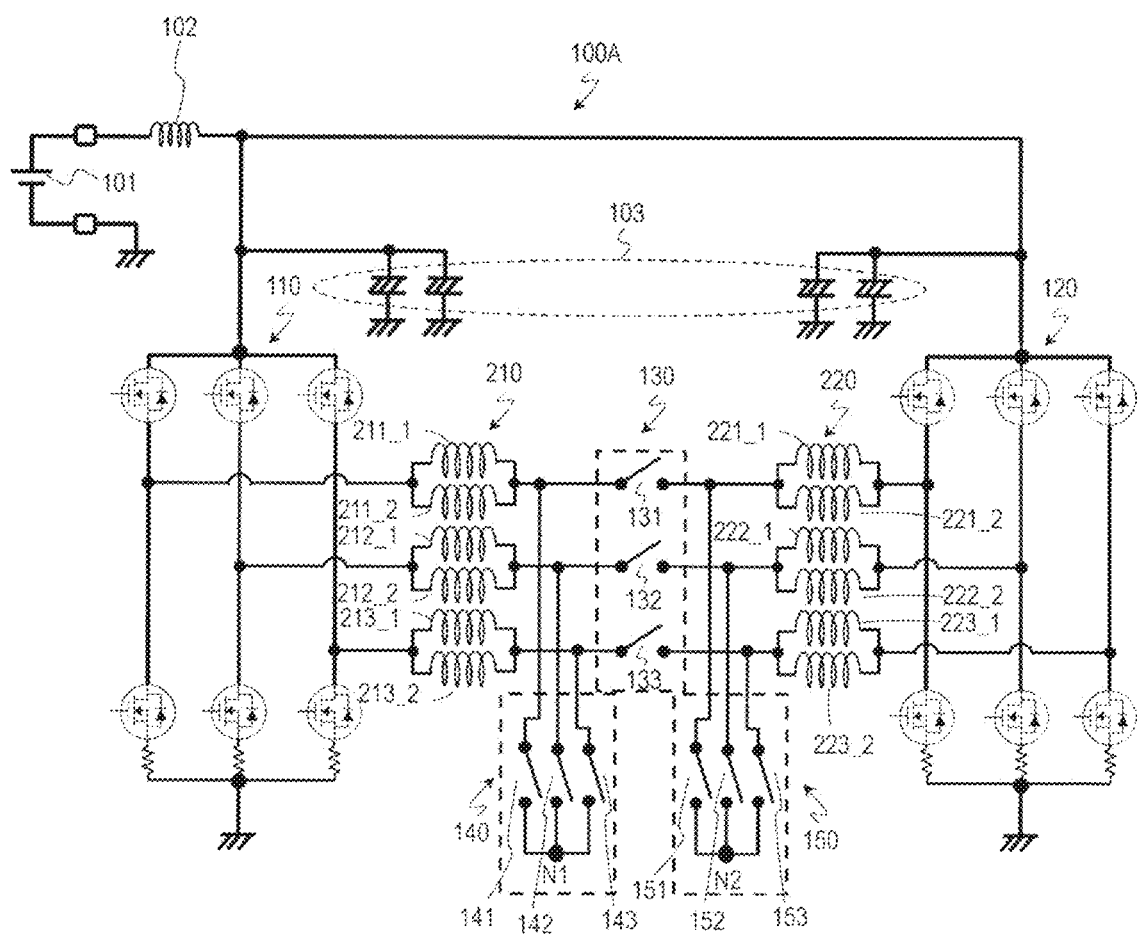
FIG. 7 is a circuit diagram showing a circuit configuration of a power conversion device (100A) according to a modification of the first example embodiment of the present disclosure.

FIG. 7 is a schematic view showing a circuit configuration of a power conversion device 100A according to a modification of the present example embodiment.

In the power conversion device 100A according to the modification of the present example embodiment, a first coil group 210 includes three coil groups of three phases each having at least two coils connected in parallel, and a second coil group 220 includes three coil groups of three phases each having at least two coils connected in parallel. FIG. 7 shows an example of a configuration in which a coil group of each phase has two coils connected in parallel.

A separation relay circuit 130 may switch between connection and disconnection between the three coil groups in the first coil group 210 and the three coil groups in the second coil group 220.

A first neutral point relay circuit 140 includes three first neutral point relays 141, 142, and 143 of which one ends are commonly connected to a node N1 and of which the other ends are connected to the three coil groups in the first coil group 210. A second neutral point relay circuit 150 has three second neutral point relays 151, 152, and 153 of which one ends are commonly connected to a node N2 and of which the other ends are connected to the three coil groups in the second coil group 220.

According to the modification, for example, even when disconnection occurs in a coil 211_1 in a U-phase coil group among the three coil groups in the first coil group 210, coils 211_2, 221_1, and 221_2 may be used as U-phase coils, and motor drive in a first or second operation mode may be continued. For example, even when disconnection further occurs in the coil 221_2 in the U-phase coil group among the three coil groups in the second coil group 220, the coils 211_2 and 221_1 may be used as U-phase coils, and the motor drive in the first or second operation mode may be continued. As described above, even when disconnection occurs in one of the plurality of coils included in one phase, the motor drive in the first or second operation mode may be continued using the other coils.

Figure 8A:
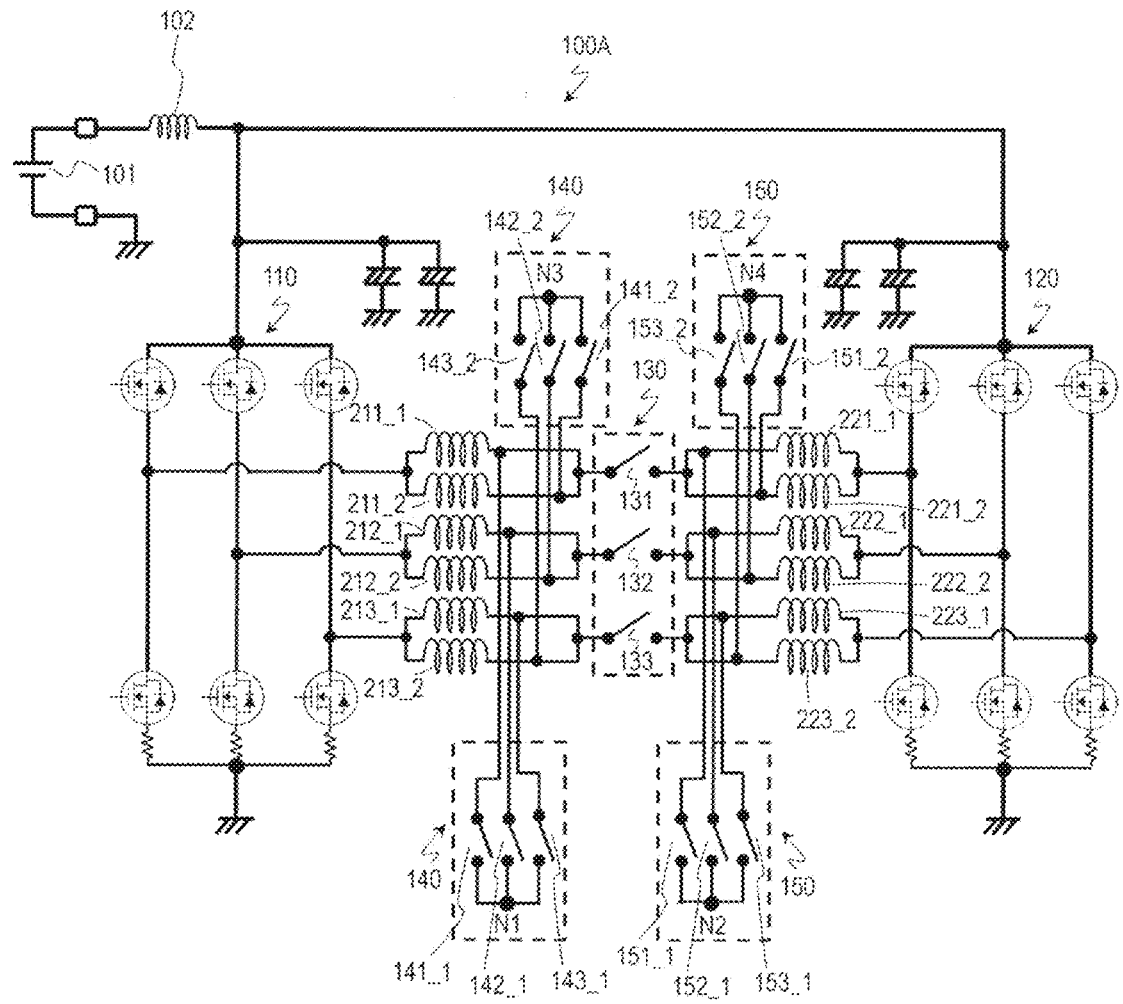
FIG. 8A is a circuit diagram showing another circuit configuration of the power conversion device (100A) according to the modification of the first example embodiment of the present disclosure.

FIG. 8A is a schematic view showing another circuit configuration of the power conversion device 100A according to the modification of the present example embodiment.

In the power conversion device 100A according to the modification of the present example embodiment, a first coil group 210 includes three coil groups of three phases each having two coils connected in parallel, and a second coil group 220 includes three coil groups of three phases each having two coils connected in parallel. A separation relay circuit 130 may switch between connection and disconnection between the three coil groups in the first coil group 210 and the three coil groups in the second coil group 220.

A first neutral point relay circuit 140 includes three first neutral point relays 141_1, 142_1, and 143_1 of which one ends are commonly connected to a node N1 and of which the other ends are connected to one of two coils of each of the three coil groups in the first coil group 210. The first neutral point relay circuit 140 further includes three first neutral point relays 141_2, 142_2, and 143_2 of which one ends are commonly connected to a node N3 and of which the other ends are connected to the other one of the two coils of each of the three coil groups in the first coil group 210.

In FIG. 8A, the first neutral point relay 141_1 is connected to a coil 211_1 in a U-phase coil group of the first coil group 210, the first neutral point relay 142_1 is connected to a coil 212_1 in a V-phase coil group, and the first neutral point relay 143_1 is connected to a coil 213_1 in a W-phase coil group. The first neutral point relay 141_2 is connected to a coil 211_2 in the U-phase coil group, the first neutral point relay 142_2 is connected to a coil 212_2 in the V-phase coil group, and the first neutral point relay 143_2 is connected to a coil 213_2 in the W-phase coil group.

A second neutral point relay circuit 150 includes three second neutral point relays 151_1, 152_1, and 153_1 of which one ends are commonly connected to a node N2 and of which the other ends are connected to one of two coils of each of the three coil groups in the second coil group 220. The second neutral point relay circuit 150 further includes three second neutral point relays 151_2, 152_2, and 153_2 of which one ends are commonly connected to a node N4 and of which the other ends are connected to the other one of the two coils of each of the three coil groups in the second coil group 220.

In FIG. 8A, the second neutral point relay 151_1 is connected to a coil 221_1 in the U-phase coil group of the second coil group 220, the second neutral point relay 152_1 is connected to a coil 222_1 in the V-phase coil group, and the second neutral point relay 153_1 is connected to a coil 223_1 in the W-phase coil group. The second neutral point relay 151_2 is connected to a coil 221_2 in the U-phase coil group, the second neutral point relay 152_2 is connected to a coil 222_2 in the V-phase coil group, and the second neutral point relay 153_2 is connected to a coil 223_2 in the W-phase coil group.

According to the modification, for example, it is assumed that the coils 211_1 and 212_1 in the first coil group 210 and the coil 223_1 in the second coil group 220 are simultaneously disconnected in each phase. For example, the separation relay circuit 130 may be turned on, the first and second neutral point relay circuits 140 and 150 may be turned off, and motor drive in a first operation mode may be continued using the coils that are not disconnected.

For example, the separation relay circuit 130 may be turned off, and motor drive in a second operation mode may be continued. In this case, the control circuit 300 turns off all three of the first neutral point relays 141_1, 142_1, and 143_1 including the first neutral point relay connected to the disconnected coils 211_1 and 212_1, and turns on the other first neutral point relays 141_2, 142_2, and 143_2. Accordingly, the coils 211_2, 212_2 and 213_2 are Y-connected. The first inverter 110 may allow the Y-connected coils 211_2, 212_2, and 213_2 to be conductive.

For example, the control circuit 300 turns off all three of the second neutral point relays 151_1, 152_1, and 153_1 including the second neutral point relay connected to the disconnected coil 223_1, and turns on the other second neutral point relays 151_2, 152_2, and 153_2. Accordingly, the coils 221_2, 222_2, and 223_2 are Y-connected. The second inverter 120 may allow the Y-connected coils 221_2, 222_2, and 223_2 to be conductive. As described above, even when disconnection occurs in one of the plurality of windings included in one phase, the motor drive in the first or second operation mode may be continued using the other coils.

Figure 8B:
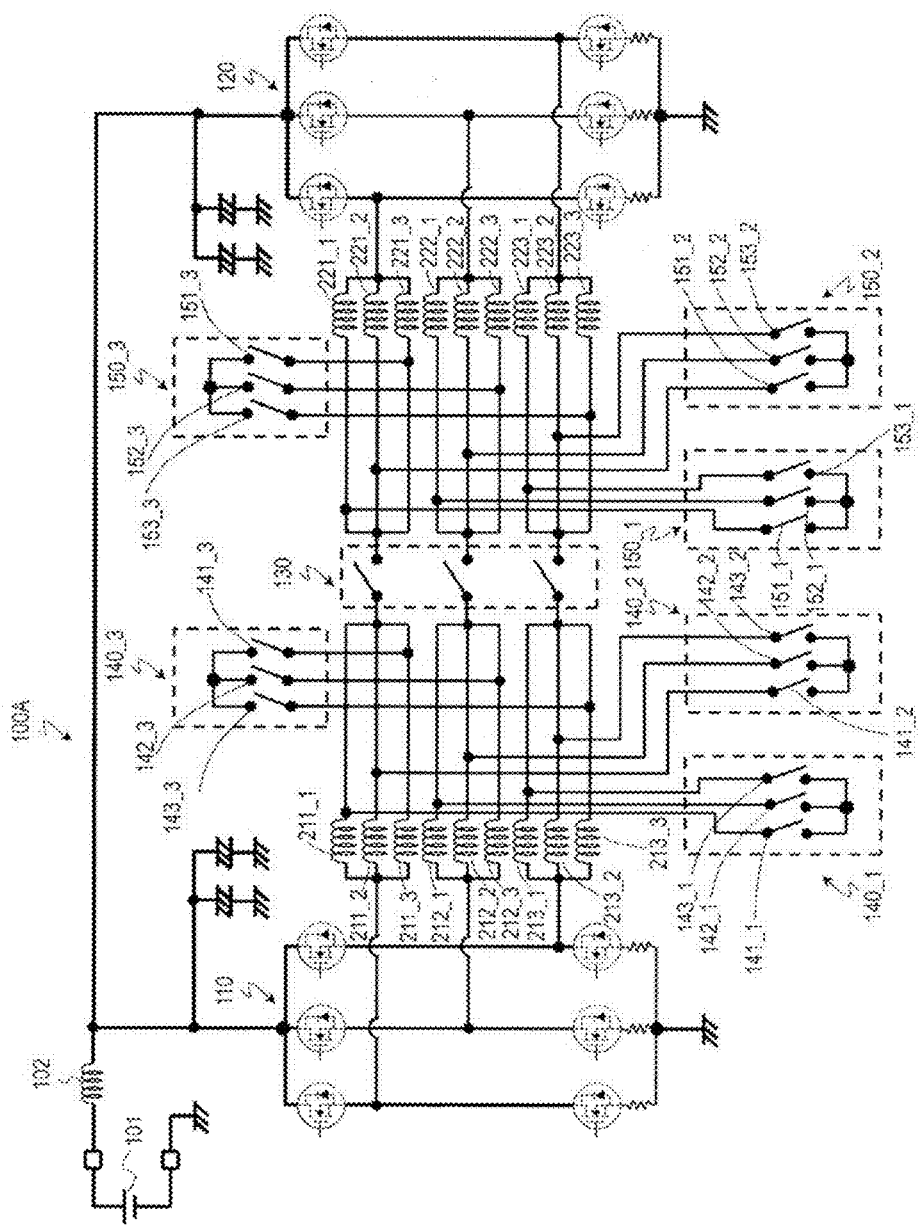
FIG. 8B is a circuit diagram showing still another circuit configuration of the power conversion device (100A) according to the modification of the first example embodiment of the present disclosure.

FIG. 8B is a schematic view showing still another circuit configuration of the power conversion device 100A according to the modification of the present example embodiment.

The number of coils included in a coil group of each phase is not limited to two. A first coil group 210 may include three coil groups each having three or more coils connected in parallel. A second coil group 220 may include three coil groups each having three or more coils connected in parallel. FIG. 8B shows an example of a configuration in which the coil group of each phase includes three coils.

A first neutral point relay circuit 140 includes three neutral point relay circuits 140_1, 140_2, and 140_3. Each of the neutral point relay circuits includes three first neutral point relays. The three coils in each of the three coil groups of the first coil group 210 are connected to the three neutral point relay circuits 140_1, 140_2, and 140_3.

For example, a coil 211_1 in a U-phase coil group is connected to a first neutral point relay 141_1. A coil 211_2 is connected to a first neutral point relay 141_2. A coil 211_3 is connected to a first neutral point relay 141_3. A coil 212_1 in a V-phase coil group is connected to a first neutral point relay 142_1. A coil 212_2 is connected to a first neutral point relay 142_2. A coil 212_3 is connected to a first neutral point relay 142_3. A coil 213_1 in a W-phase coil group is connected to a first neutral point relay 143_1. A coil 213_2 is connected to a first neutral point relay 143_2. A coil 213_3 is connected to a first neutral point relay 143_3.

A second neutral point relay circuit 150 includes three neutral point relay circuits 150_1, 150_2, and 150_3. Each of the neutral point relay circuits includes three second neutral point relays. The three coils in each of the three coil groups of the second coil group 220 are connected to the three neutral point relay circuits 150_1, 150_2, and 150_3.

For example, a coil 221_1 in a U-phase coil group is connected to a second neutral point relay 151_1. A coil 221_2 is connected to a second neutral point relay 151_2. A coil 221_3 is connected to a second neutral point relay 151_3. A coil 222_1 in a V-phase coil group is connected to a second neutral point relay 152_1. A coil 222_2 is connected to a second neutral point relay 152_2. A coil 222_3 is connected to a second neutral point relay 152_3. A coil 223_1 in a W-phase coil group is connected to a second neutral point relay 153_1. A coil 223_2 is connected to a second neutral point relay 153_2. A coil 223_3 is connected to a second neutral point relay 153_3.

A power conversion device 100B according to the present example embodiment may convert power supplied from a power supply 101 into power to be supplied to a three-phase motor having m (m is an integer of three or more) coil groups that may be connected in series. Hereinafter, a difference from the power conversion device 100 according to the first example embodiment will be mainly described.

Figure 9:
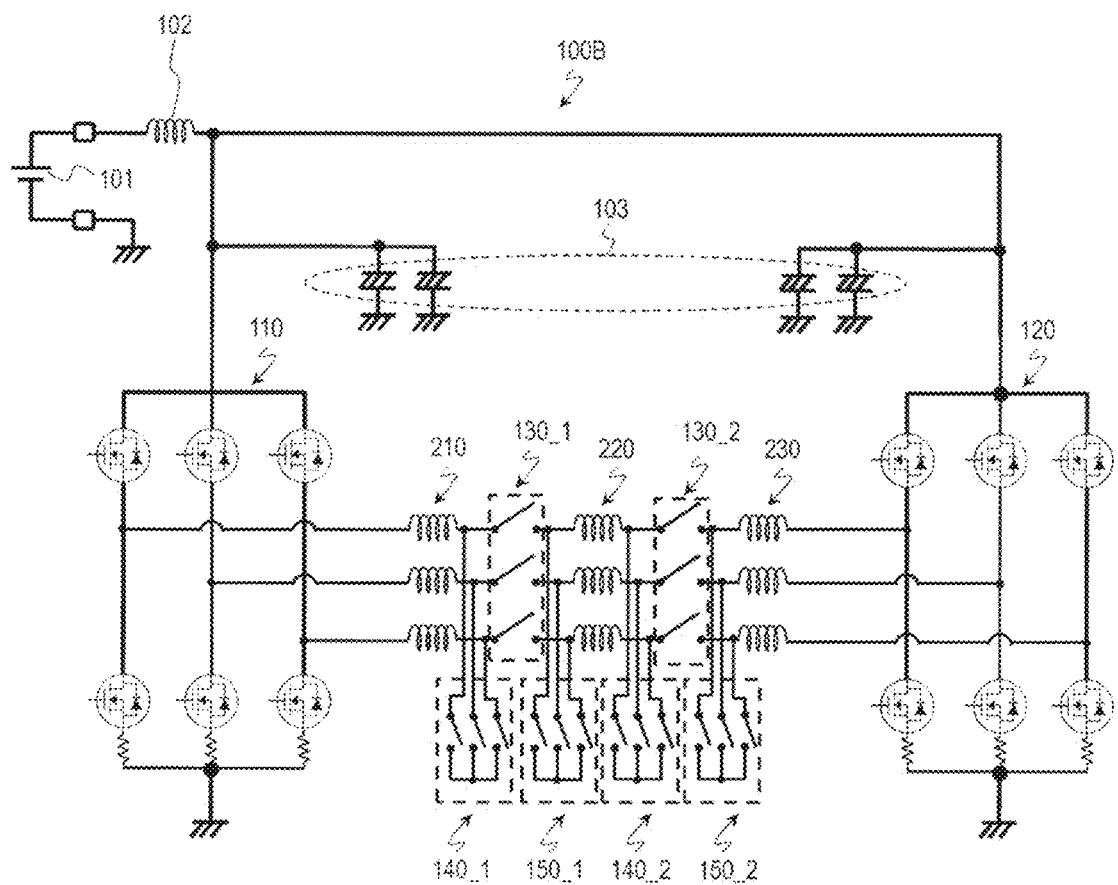
FIG. 9 is a circuit diagram showing a typical circuit configuration of a power conversion device (100B) according to a second example embodiment of the present disclosure.

FIG. 9 schematically shows a typical circuit configuration of the power conversion device 100B according to the present example embodiment.

FIG. 9 shows an example of a three-phase motor having three coil groups 210, 220, and 230 that may be connected in series. A first inverter 110 is connected to one end of each of the three coil groups 210, 220, and 230, and a second inverter 120 is connected to the other end of each of the three coil groups 210, 220, and 230.

Two separation relay circuits 130_1 and 130_2 are disposed between and connected to two adjacent coil groups in the three coil groups 210, 220, and 230. Each of the separation relay circuits may switch between connection and disconnection of the two adjacent coil groups. Specifically, the separation relay circuit 130_1 may be disposed between and connected to the first and second coil groups 210 and 220 and may switch between connection and disconnection of the two coil groups. The separation relay circuit 130_2 may be disposed between and connected to the second and third coil groups 220 and 230 and may switch between connection and disconnection of two coil groups.

Two first neutral point relay circuits 140_1 and 140_2 are provided between the two adjacent coil groups. Each of the first neutral point relay circuits may switch between connection and disconnection of ends of the coil group on a side of the first inverter 110 among the two adjacent coil groups.

The first neutral point relay circuit 140_1 is provided between the first and second coil groups 210 and 220 on a side of the first inverter 110 of the separation relay circuit 130_1. The first neutral point relay circuit 140_1 may switch between connection and disconnection of ends of the first coil group 210. The first neutral point relay circuit 140_2 is provided between the second and third coil groups 220 and 230 on a side of the first inverter 110 of the separation relay circuit 130_2. The first neutral point relay circuit 140_2 may switch between connection and disconnection of ends of the second coil group 220.

Two second neutral point relay circuits 150_1 and 150_2 are provided between two adjacent coil groups. Each of the second neutral point relay circuits may switch between connection and disconnection of ends of the coil groups on a side of the second inverter 120 among the two adjacent coil groups.

The second neutral point relay circuit 150_1 is provided between the first and second coil groups 210 and 220 on a side of the second inverter 120 of the separation relay circuit 130_1. The second neutral point relay circuit 150_1 may switch between connection and disconnection of ends of the second coil group 220. The second neutral point relay circuit 150_2 is provided between the second and third coil groups 220 and 230 on a side of the second inverter 120 of the separation relay circuit 130_2. The second neutral point relay circuit 150_2 may switch between connection and disconnection of ends of the third coil group 230.

Configurations of each of the separation relay circuits and each of the neutral point relay circuits are as described in the first example embodiment. Here, detailed descriptions thereof will be omitted.

A control circuit 300 controls on-and-off states of the two separation relay circuits 130_1 and 130_2, the two first neutral point relay circuits 140_1 and 140_2, and the two second neutral point relay circuits 150_1 and 150_2. Accordingly, it is possible to change the number of coil groups connected to the first inverter 110 and the number of coil groups connected to the second inverter 120 among the three coil groups 210, 220, and 230.

For example, the control circuit 300 turns the separation relay circuit 130_1 on to turn the separation relay circuit 130_2 off, turns the first neutral point relay circuit 140_1 off to turn the first neutral point relay circuit 140_2 on, and turns the second neutral point relay circuit 150_1 off to turn the second neutral point relay circuit 150_2 on. In this case, the first and second coil groups 210 and 220 are connected to the first inverter 110, and the third coil group 230 is connected to the second inverter 120. By turning the first neutral point relay circuit 140_2 on, the second coil group 220 is Y-connected. By turning the second neutral point relay circuit 150_2 on, the third coil group 230 is Y-connected. According to the above connection, the first inverter 110 may allow the first and second coil groups 210 and 220 to be conductive, and the second inverter 120 may allow the third coil group 230 to be conductive.

For example, when the second coil group 220 is broken, the broken second coil group 220 may be electrically separated from the two inverters by turning the separation relay circuits 130_1 and 130_2 off. Motor drive may be continued by allowing the first coil group 210 and the third coil group 230 to be conductive.

A motor torque is proportional to a length of a coil side and the number of windings. According to the present example embodiment, it is possible to change a motor output to have an arbitrary size by changing the number of coil groups connected to the first inverter 110 and changing the number of coil groups connected to the second inverter 120.

Figure 10:
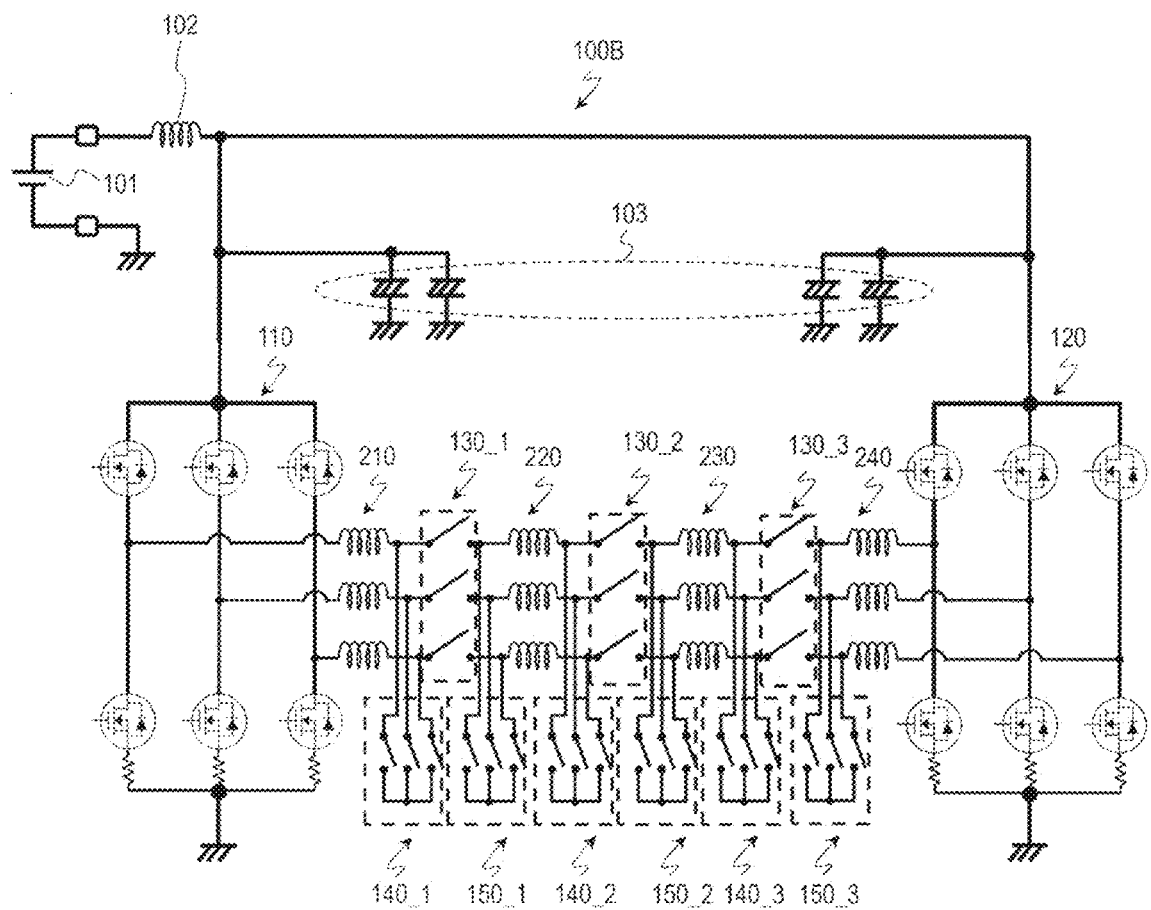
FIG. 10 is a circuit diagram showing another circuit configuration of the power conversion device (100B) according to the second example embodiment of the present disclosure.

FIG. 10 is a schematic view showing another circuit configuration of the power conversion device 100B according to the present example embodiment.

FIG. 10 shows an example of the circuit configuration of the power conversion device 100B in which a motor 200 having four coil groups 210, 220, 230, and 240 that may be connected in series may be driven.

The power conversion device 100B shown in FIG. 10 includes three separation relay circuits 130_1, 130_2, and 130_3, three first neutral point relay circuits 140_1, 140_2, and 140_3, and three second neutral point relay circuits 150_1, 150_2, and 150_3. By increasing the number of coil groups and the number of separation relay circuits and neutral point relay circuits connected to the coil groups, it is possible to change a motor output with high accuracy to have an arbitrary size.

Figure 11:
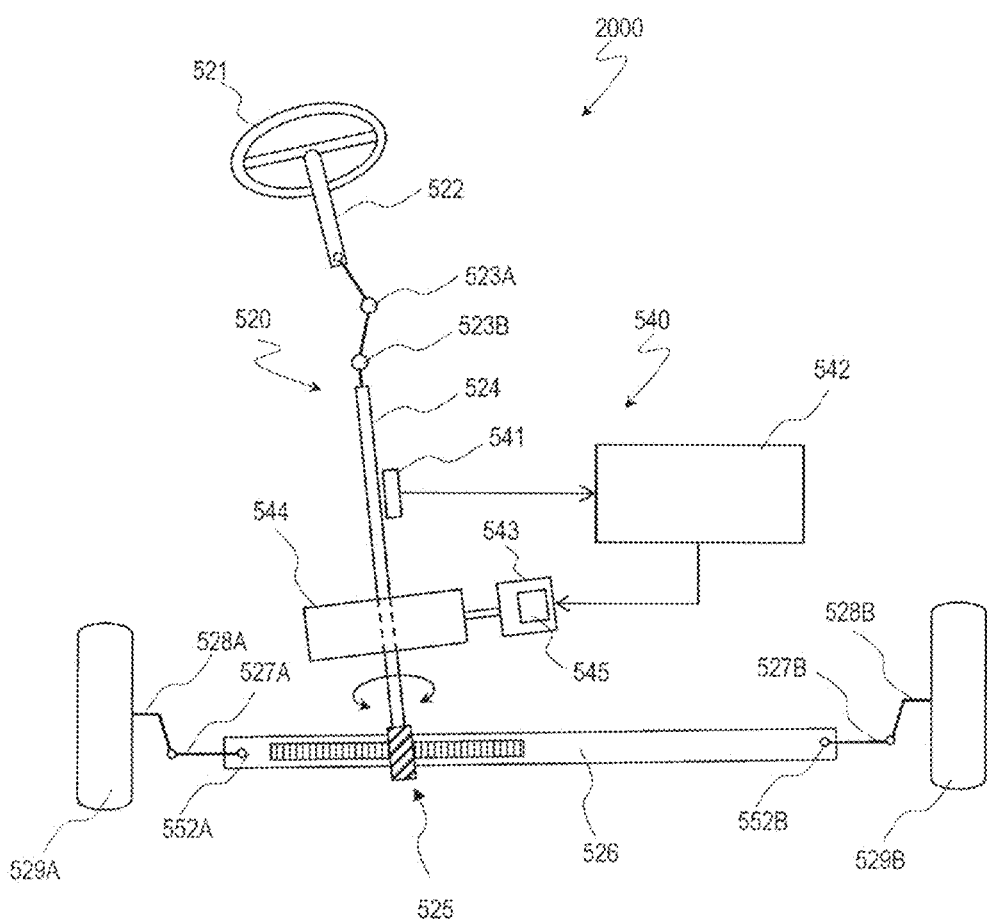
FIG. 11 is a schematic view showing a typical configuration of an electric power steering device (2000) according to a third example embodiment of the present disclosure.

FIG. 11 is a schematic view showing a typical configuration of an electric power steering device 2000 according to the present example embodiment.

Generally, vehicles, such as automobiles, each have an electric power steering (EPS) device. According to the present example embodiment the electric power steering device 2000 includes a steering system 520, and an assistance torque mechanism 540 for generating an assistance torque. The electric power steering device 2000 generates an assistance torque that assists with a steering torque of the steering system generated by a driver operating a steering wheel. The burden on the driver's operation is reduced due to the assistance torque.

The steering system 520 includes, for example, a steering handle 521, a steering shaft 522, material shaft joints 523A and 523B, a rotation shaft 524, a rack and pinion mechanism 525, a rack shaft 526, left and right ball joints 552A and 552B, tie rods 527A and 527B, knuckles 528A and 528B, and left and right steering wheels 529A and 529B.

The assistance torque mechanism 540 includes, for example, a steering torque sensor 541, an electronic control unit (ECU) 542 for a vehicle, a motor 543, and a deceleration mechanism 544. The steering torque sensor 541 detects a steering torque in the steering system 520. The ECU 542 generates a drive signal on the basis of a signal detected in the steering torque sensor 541. The motor 543 generates an assistance torque corresponding to the steering torque in response to the drive signal. The motor 543 transmits the assistance torque generated in the steering system 520 through the deceleration mechanism 544.

The ECU 542 includes, for example, the microcontroller 340 and the drive circuit 350 according to the first example embodiment. In automobiles, an electronic control system including an ECU as a core is constructed. In the electric power steering device 2000, for example, a motor drive unit is constructed with the ECU 542, the motor 543, and the inverter 545. The motor drive unit 1000 according to the first example embodiment may be appropriately used for the above motor drive unit.

The example embodiments of the present disclosure can be widely used in various devices including various motors, such as those of vacuum cleaners, dryers, ceiling fans, washing machines, refrigerators, and electric power steering devices.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power conversion device that converts power supplied from a power supply into power to be supplied to an n-phase motor including m coil groups connected in series, n and m being an integer equal to three or more, the power conversion device comprising:
   a first inverter connected to first ends of the m coil groups;
   a second inverter connected to second ends of the m coil groups;
   m−1 separation relay circuits connected between two adjacent coil groups of the m coil groups to switch between connection and disconnection of the two adjacent coil groups;
   m−1 first neutral point relay circuits provided between two adjacent coil groups of the first inverter side of each of the m−1 separation relay circuits to switch between connection and disconnection of ends of the coil group of the first inverter side among the two adjacent coil groups; and m−1 second neutral point relay circuits provided between two adjacent coils of the second inverter side of each of the m−1 separation relay circuits to switch between connection and disconnection of ends of the coil group of the second inverter side among the two adjacent coil groups; wherein each of the m coil groups includes n coils;

each of the m−1 separation relay circuits includes n separation relays to switch between connection and disconnection of the n coils of one of two adjacent coil groups and the n coils of the other of two adjacent coil groups;

each of the m−1 first neutral point relay circuits includes n first neutral point relays of which first ends are commonly connected to a first node and of which the other end are connected to the n coils of the coil group of the first inverter side among the two adjacent coil groups; and each of the m−1 second neutral point relay circuits includes n second neutral point relays, of which first ends are commonly connected to a second node and of which second ends are connected to the n coils in the coil group of the second inverter side among the two adjacent coil groups.

2. The power conversion device of claim 1, wherein a number of the coil groups connected to the first inverter and a number of the coil groups connected to the second inverter among the m coil groups are changed by controlling on-and-off states of the m−1 separation relay circuits, the m−1 first neutral point relay circuits, and the m−1 second neutral point relay circuits.

3. A motor drive unit comprising:
a motor;
the power conversion device according to claim 1; and
a control circuit to control the power conversion device.

4. An electric power steering device comprising the motor drive unit according to claim 3.

* * * * *